United States Patent [19]

Suzuki

[11] Patent Number: 4,639,767
[45] Date of Patent: Jan. 27, 1987

[54] APPARATUS FOR DETECTING MOVEMENT IN A TELEVISION SIGNAL BASED ON TAKING RATIO OF SIGNAL REPRESENTING FRAME DIFFERENCE TO SIGNAL REPRESENTING SUM OF PICTURE ELEMENT DIFFERENCES

[75] Inventor: Norio Suzuki, Tokyo, Japan

[73] Assignee: NEC Corporation, Japan

[21] Appl. No.: 648,984

[22] Filed: Sep. 7, 1984

[30] Foreign Application Priority Data

Sep. 8, 1983 [JP] Japan .................................. 58-165447
Nov. 15, 1983 [JP] Japan .................................. 58-214541

[51] Int. Cl.⁴ ............................................. H04N 9/64
[52] U.S. Cl. .................................... 358/21 R; 358/105
[58] Field of Search ..................... 358/10, 21 R, 105

[56]   References Cited
U.S. PATENT DOCUMENTS

| 3,890,462 | 6/1975 | Limb et al. | 358/105 |
| 4,218,703 | 8/1980 | Netravali et al. | 358/105 |
| 4,242,704 | 12/1980 | Ito et al. | 358/36 |
| 4,528,598 | 7/1985 | Trytko et al. | 358/21 R |

OTHER PUBLICATIONS

Article "Estimating the Velocity of Moving Images in Television Signals" by Limb et al., Bell Telephone Laboratories, *Computer Graphics and Image Processing*, (1975) 4, pp. 311-327.

Primary Examiner—John W. Shepperd
Attorney, Agent, or Firm—Ostrolenk, Faber, Gerb & Soffen

[57]   ABSTRACT

A circuit for detecting the degree of movement in a television signal. The circuit is not affected by the direction in which picture elements move over the image area. Primarily, differences from frame to frame are detected as well as differences between picture elements of the same frame or picture element differences from frame to frame. The degree of image movement is determined by the ratio of the signal representing the frame difference and of a signal which represents the sum of the picture element differences. In further embodiments, image movement detection is based on detecting the brightness and/or chrominance components of the television signal and producing the frame difference signal based on these signal components or as a ratio of the frame difference signal and these signal components. The brightness (Y) signal can be extracted from the input television signal in a high frequency brightness signal extracting circuit. The frame difference signal is then based on the frame to frame difference of this high frequency Y signal.

12 Claims, 21 Drawing Figures

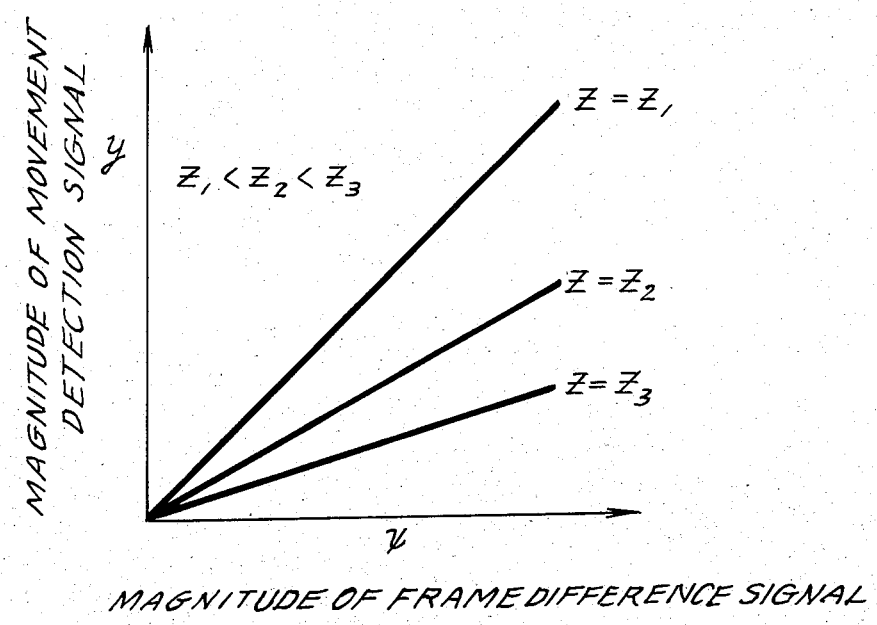

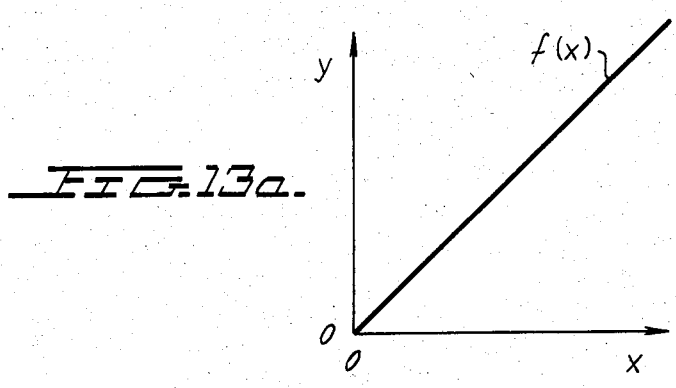
FIG. 13a.
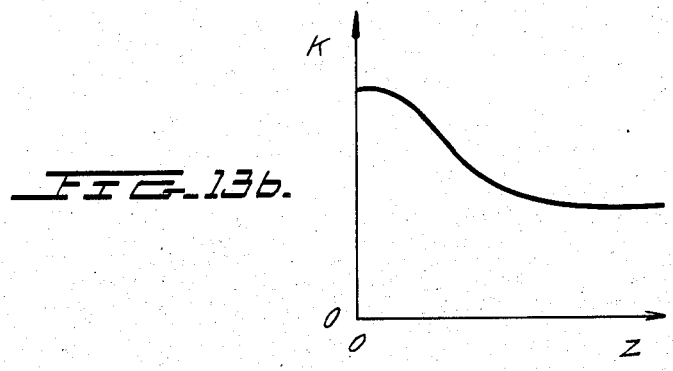
FIG. 13b.
FIG. 14.
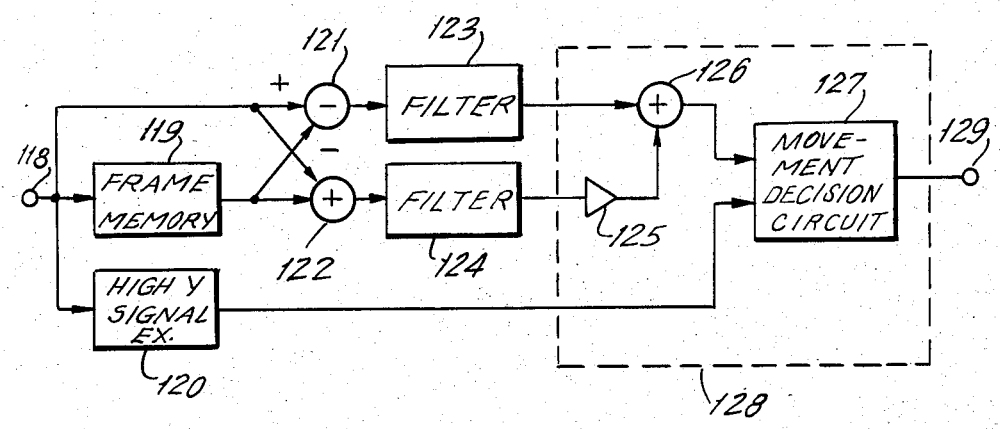

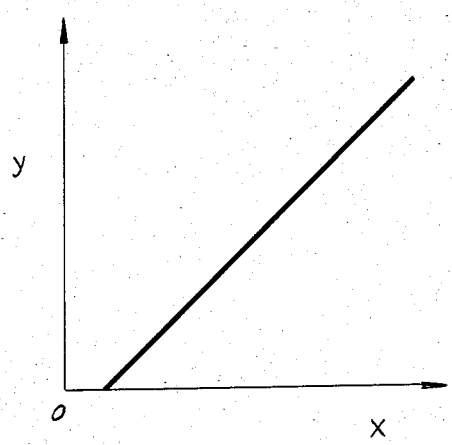
_FIG.18_
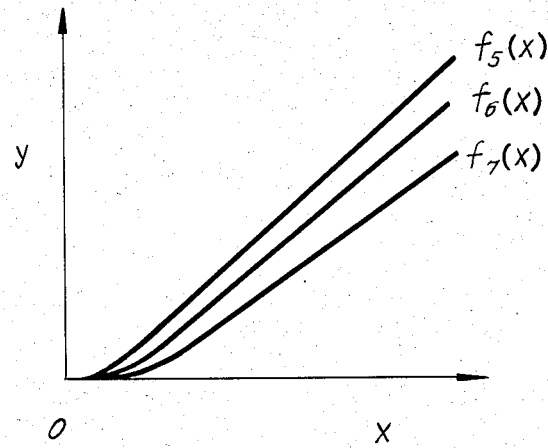
_FIG.19_

APPARATUS FOR DETECTING MOVEMENT IN A TELEVISION SIGNAL BASED ON TAKING RATIO OF SIGNAL REPRESENTING FRAME DIFFERENCE TO SIGNAL REPRESENTING SUM OF PICTURE ELEMENT DIFFERENCES

BACKGROUND OF THE INVENTION

The present invention relates to a movement detecting apparatus for detecting the degree of movement of images which are encoded and transmitted by means of a television signal.

As processing circuits for a television signal, there are known a noise reduction system using a frame-memory, an adaptive Y/C separator, a scanning sequence converter, as well as their circuits. One of the major problems to be solved in an apparatus of this type is to successfully detect the degree of movement of images which are represented by the television signal.

In the case of a monochromatic television signal, an interframe difference signal is generated by using a frame memory, and the degree of movement is detected based on the level of the interframe difference signal. On the other hand, in the case of a composite color television signal, one proposed method is to invert the polarity of a chrominance signal to match the phase of a color subcarrier in the NTSC system, and to generate an interframe difference signal which relates the degree of movement based on the level thereof. The above method is a suitable broad detection approach and it can be implemented with relatively simple hardware. But it is unsuccessful in detecting at the edge portion of an image. As an alternative, there is proposed a method by J. O. LIMB and J. A. MURPHY that is adapted to detect the velocity of moving images. This method is reported in "COMPUTER GRAPHICS AND IMAGE PROCESSING", April 1975, pp. 311-327, by the title of "Estimating the Velocity of Moving Images in Television Signals". According to the method, the speed S of moving images is determined by the following equation:

$$S = \sum_{MA} |FDS| / \sum_{MA} |EDS|$$

where FDS represents a frame difference signal, EDS represents a picture element difference signal and MA represents a moving area. With this method, the speed can be detected correctly and movement detection can be reliably performed at the edge portion of an image without error. However, the method is disadvantageous in that it necessarily requires more hardware when it is directly applied for processing a television signal in a real time base, because the moving area must be first detected and the total sum of the respective difference signals must be then calculated for the moving area in the real time.

In practice, it is not necessary to detect a direction of movement when the moving detection is applied to the adaptive Y/C separator, the scanning sequence converter or the like. Further, in such apparatus, it is also not necessary to precisely detect the speed of movement. When applying the moving detection to such apparatus, of importance is to know the approximate speed of moving area in the picture and not to erroneously interpret stationary image edges as a moving portion of the picture.

SUMMARY OF THE INVENTION

It is an object of the present invention to provide a movement detecting apparatus which detects a movement of a television signal with simple hardware which is adapted to prevent misidentification of an edge portion of a stationary image as a moving television signal.

According to a first feature of the present invention, there is provided a movement detecting apparatus for detecting a degree of movement contained in a television signal, the apparatus comprises; means for obtaining a frame difference signal; means for obtaining a picture element difference sum signal; and means for detecting the degree of the movement based on the frame difference signal and the picture element difference sum signal.

According to a second feature of the present invention, there is provided a movement detecting apparatus for detecting a degree of movement contained in a television signal, the apparatus comprising; means for obtaining a frame difference signal; means for obtaining a high frequency component of a brightness signal contained in the television signal; and means for detecting the degree of movement based on the frame difference signal and the obtained high frequency component.

BRIEF DESCRIPTION OF THE DRAWINGS

FIG. 13 depicts input/output characteristics of a movement decision circuit shown in FIG. 11;

FIGS. 13 (a) and (b) show examples of input/output characteristics of a movement decision circuit shown in FIG. 11;

FIG. 14 is a block diagram of a seventh embodiment of the present invention;

FIGS. 18 and 19 show other examples of the input/output characteristic of the movement decision circuit shown in FIG. 14.

DETAILED DESCRIPTION OF PREFERRED EMBODIMENTS

Figure 1:
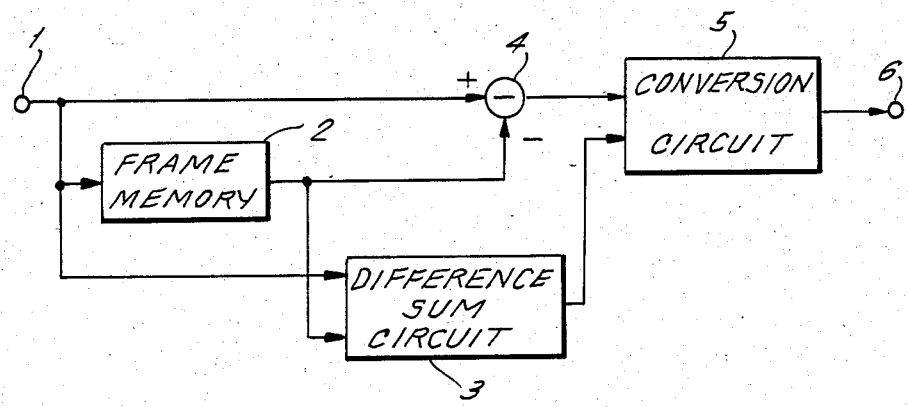
FIG. 1 is a block diagram of a first embodiment of the present invention.

With reference to FIG. 1 showing a block diagram of a first embodiment of the present invention, a digital monochromatic television signal applied to an input terminal 1 is supplied to a subtractor 4, a frame memory 2 and a picture element difference sum computing circuit 3. The television signal delayed by one frame period through the frame memory 2 is supplied to the subtractor 4 and the picture element difference sum computing circuit 3. The subtractor 4 calculates a frame difference signal between the input television signal and the delayed television signal and applies the frame difference signal to a conversion circuit 5.

The picture element difference sum computing circuit 3 produces a picture element difference sum signal. The signal represents the total sum of absolute values of plural differences between one picture element and other picture elements in the vicinity of the one picture element, whose movement is to be detected, for the present and previous frames. This picture element difference signal is applied to the conversion circuit 5.

In other words, a frame difference signal is obtained for one picture element, whose movement is to be detected, based on the frame difference between this picture element and the picture element in the previous frame at the same position. Next, an accumulation value of the absolute values of differences between the picture element and respective front and back picture elements in the same line and between the picture element and respective picture elements having the same horizontal position and located in upper and lower lines is calculated for the present frame and the previous frame, respectively. Then, the two calculated accumulation values for the present and previous frames are added. Then the frame difference signal and the added accumulation value (the picture element difference sum signal) are both supplied to the conversion circuit 5. In this case, when there is a relative delay difference between the frame difference signal and the picture element difference sum signal, delay compensation is performed. Finally, the conversion circuit 5 obtains a signal indicating the degree of movement based on the frame difference signal and the picture element difference sum signal for each picture element, and then supplies the signal to an output terminal 6.

Figure 2:
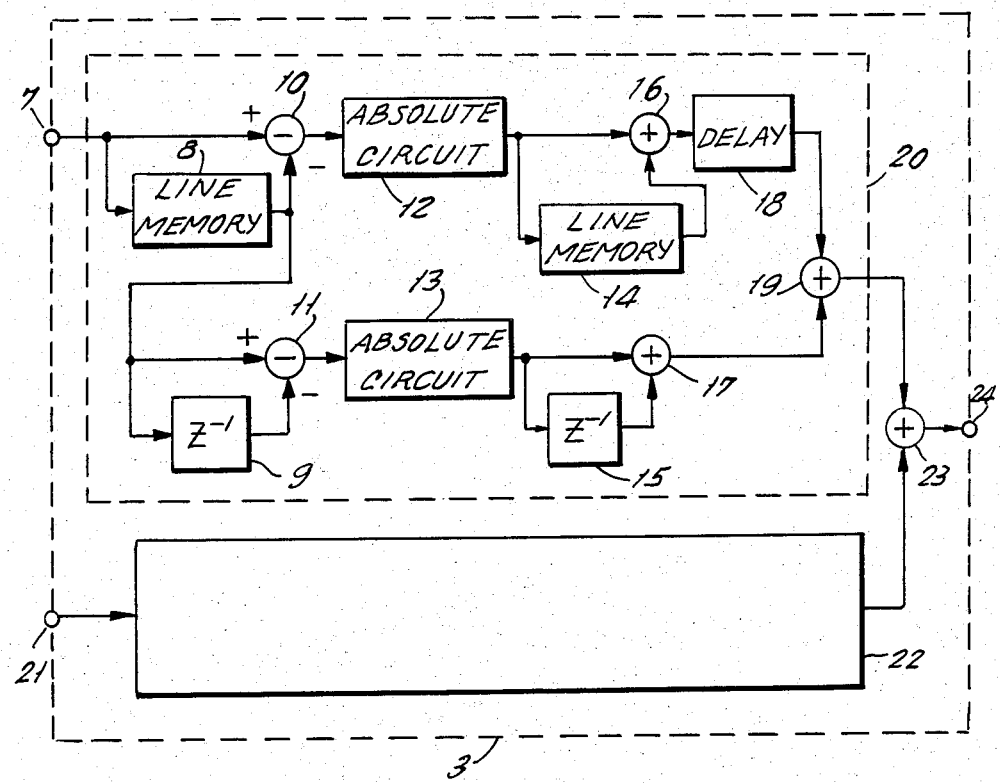
FIG. 2 is a block diagram showing a picture element difference computing circuit shown in FIG. 1.

FIG. 2 illustrates the picture element difference sum computing circuit 3 shown in FIG. 1. The digital television signal delivered from the input terminal (FIG. 1) is supplied through an input terminal 7 to a line memory 8 and a subtractor 10 in a first picture element difference sum computing circuit 20. The signal delayed by one horizontal period through the line memory 8 is supplied to subtractors 10 and 11, and a delay circuit 9. The line difference signal delivered from the subtractor 10 is fed to an absolute value circuit 12 to obtain an absolute value, i.e., an absolute line difference signal thereof, which is supplied to a line memory 14 and an adder 16. The absolute line difference signal delayed by one horizontal period through the line memory 14 is supplied to the adder 16. The adder 16 outputs the sum of the two absolute line difference signals between present and previous lines, and between present and following lines and supplies the sum to an adder 19 through a delay circuit 18 to provide delay compensation.

On the other hand, the signal delayed by one sampling period through the delay circuit 9 is supplied to a subtractor 11 which produces a sample difference signal. An absolute value circuit 13 outputs an absolute value, i.e., an absolute sample difference signal and supplies it to a one sample delay circuit 15 and an adder 17.

The adder 17 adds the absolute sample difference signal between a front sample and the present sample and the absolute sample difference signal between the present sample and a back sample, and outputs a sample difference sum signal to an adder 19. This sample difference sum signal is supplied to the adder 19. Therefore, the adder 19 outputs the sum of the line and sample difference signals relative to the upper, lower, front and back picture elements. The sum signal delivered from the adder 19 is supplied to an adder 23.

A second picture element difference sum computing circuit 22 has the same configuration as the first picture element difference sum computing circuit 20 and outputs a sum of line and sample difference signals relative to the upper, lower, front and back picture element in accordance with the delayed television signal which is applied to an input terminal 21 from the frame memory 2 (FIG. 1). The sum delivered from the circuit 22 is supplied to the adder 23. Thus, the adder 23 outputs a picture element difference sum signal for two frames, which signal is supplied to an output terminal 24.

Figure 3:
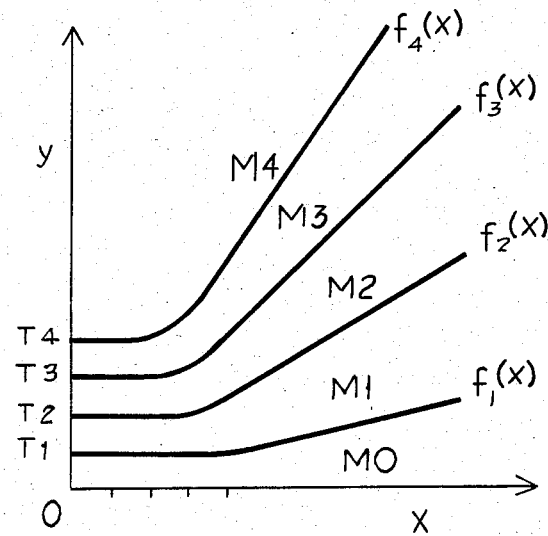
FIG. 3 shows examples of a conversion characteristic of a conversion circuit shown in FIG. 1.

FIG. 3 shows examples of conversion characteristics of the conversion circuit 5 shown in FIG. 1. The degree of movement based on the frame difference signal y and the picture element difference sum signal x is divided into five steps from stillness M0 to complete movement M4 by using the function of $y = f_1(x)$, $f_2(x)$ and $f_3(x)$ $f_4(x)$ which represent the respective boundaries.

Since the frame difference signal and the picture element difference sum signal are not obtained herein from the entire moving area, it is difficult to determine a correct speed based on both signals. Therefore, a calculated value of the ratio y/x is used as an approximate value. The portion having the small magnitude of the picture element difference sum signal x is assumed to be a flat portion and the degree of movement is decided mainly based on the magnitude of the frame difference signal. The portion having the large magnitude of the picture element difference sum signal can be regarded as a portion including many edge components, so that, taking the speed into account, the degree of movement is decided mainly based on the ratio of the frame difference signal to the picture element difference sum signal.

Threshold values $T_1$–$T_4$ meet the relationship of $T_1 \leq T_2 \leq T_3 \leq T_4$, and gradients or slope constants $K_1$–$K_4$ of $f_1(x)$–$f_4(x)$ in the portion giving the larger x meets the relationship of $K_1 \leq K_2 \leq K_3 \leq K_4$. The function of $y = f_i(x)$ is approximated by $y = T_i$ when x is small and by $y = K_i x$ (where $i = 1$–4) when x is large. The conversion circuit 5 having the characteristics shown in FIG. 3 can be realized, for example, using a read only memory (ROM). As output signals indicating the degree of movement, there are issued by way of example signals "0" through "4" corresponding to the degrees of movement M0 through M4.

Figure 4:
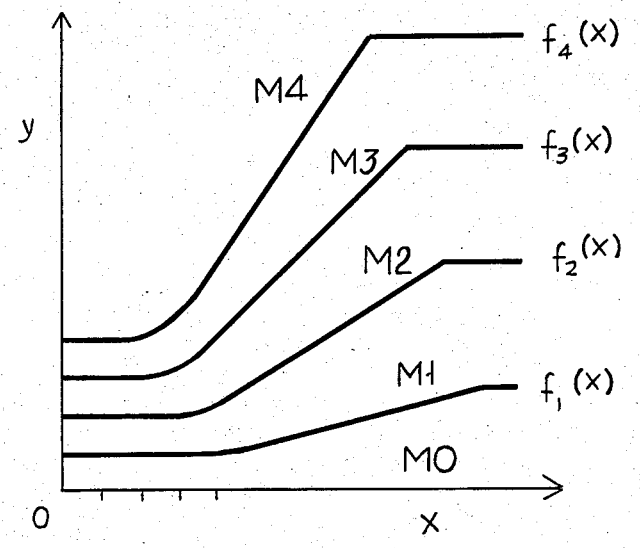
FIG. 4 shows other examples of the conversion characteristics of the conversion circuit of FIG. 1.

FIG. 4 shows alternate examples of conversion characteristics of the conversion circuit 5 shown in FIG. 1. As compared with the characteristics shown in FIG. 3, the characteristics shown in FIG. 4 are such that the frame difference signal y and the picture element difference sum signal x are limited in their magnitudes when they become larger than a certain value. As a consequence, the total number of bits for representing the magnitudes of these signals is reduced. Therefore, if a ROM is used as a conversion circuit and the frame difference signal and the picture element difference signal are applied to the address lines of the ROM, the total number of address lines is likewise reduced. What is accomplished is that the total number of bits associated with the signals is reduced to accommodate the maximum number of bits (address input lines) that are available in the ROM. Or, smaller ROMs can be used. Such bits reduction can limit the sensitivity or resolution in the movement detection operation for larger values of X and Y. However, such sensitivity reduction has been found not to matter practically.

Figure 5:
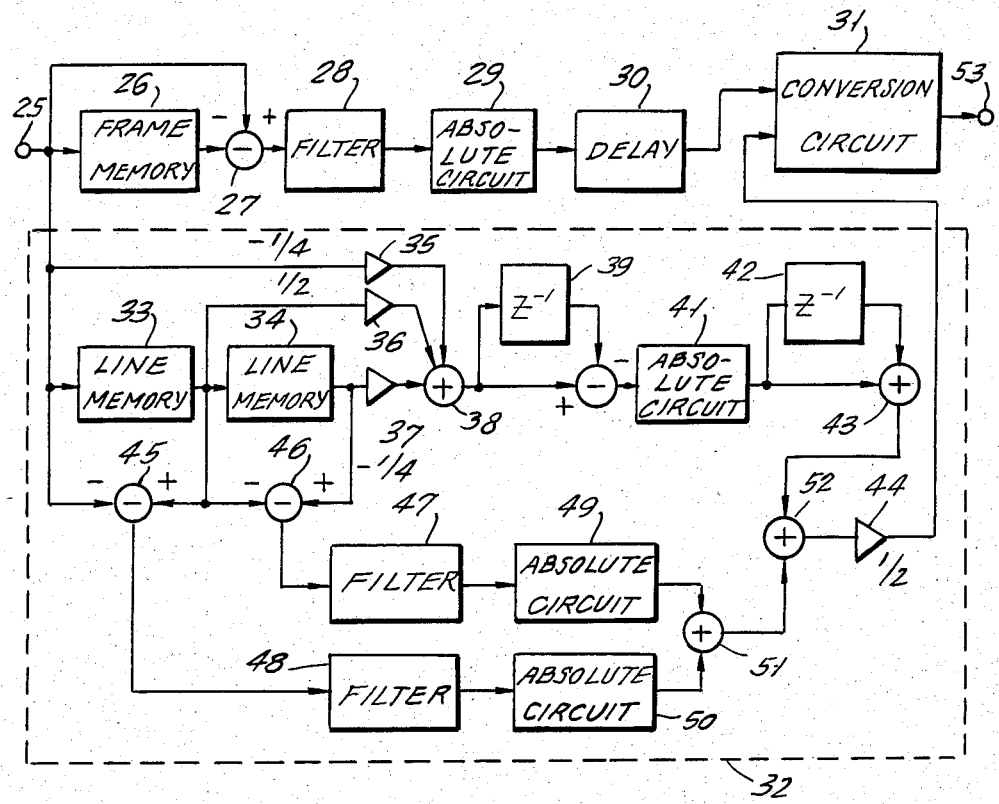
FIG. 5 is a block diagram of a second embodiment of the present invention.

FIG. 5 is a block diagram showing a second embodiment of the present invention. This embodiment is so arranged that movement detection of a color television signal in the NTSC system is performed using a frame difference signal of a brightness (Y) signal and the picture element difference sum of the Y signal within one frame. With this arrangement, accuracy of decision is somewhat lowered, but the amount or size of the hardware is reduced.

A digital color television signal in the NTSC system sampled with a multiplied by subcarrier frequency $f_{sc}$ is applied to an input terminal 25 and supplied to a frame memory 26, subtractor 27 and a picture element difference sum computing circuit 32. The frame memory 26 delays the television signal by one frame period and outputs it to the subtractor 27. The frame difference signal delivered from the subtractor 27 is supplied through a filter 28 which removes the component of the subcarrier $f_{sc}$, to an absolute value circuit 29 which produces an absolute value thereof. The absolute value delivered from the absolute value circuit 29 is supplied through a delay circuit 30 to a conversion circuit 31 and constitutes the frame difference signal.

The delay circuit 30 compensates for a delay between the frame difference signal and a picture element difference signal, which is delivered from a picture element difference sum computing circuit 32.

The picture element difference sum computing circuit 32 comprises line memories 33 and 34 for delaying the input signal by one line period, multipliers 35, 36, 37 and 44 having coefficients of $-\frac{1}{4}, \frac{1}{2}, -\frac{1}{4}, \frac{1}{2}$, respectively, adders 38, 43, 51 and 52, registers 39 and 42 for producing a one sampling period, delay subtractors 40, 45 and 46, absolute value circuits 41, 49 and 50, and filters 47 and 48 for removing the component of the subcarrier $f_{sc}$.

In the picture element difference sum computing circuit 32, a brightness (Y) signal is extracted from the input color television signal by a comb filter of a 2-line type, which comprises the line memories 33 and 34, multipliers 35, 36 and 37, and the adder 38. The Y signal delivered from the comb filter is transmitted to the combination of the registers 39 and 42, the subtractor 40, and the adder 43. This combination operates to produce the sum of sample difference signals as does the similar circuit of FIG. 2.

On the other hand, the two signals delivered from the subtractors 45 and 46 are processed through the filters 47 and 48, and the absolute value circuits 49 and 50 for producing line difference signals. The two line difference signals are added in the adder 51. The sum of the sample difference signals and the sum of the line difference signals are added in the adder 52 and scaled in the multiplier 44 to produce the picture element difference sum signal. The picture element difference sum signal is supplied to the conversion circuit 31.

The conversion circuit 31 has the same function as the conversion circuit 5 of FIG. 1, so that it outputs a signal indicating the degree of movement based on the frame difference signal and the picture element difference sum signal. It is to be noted that, if there is a phase difference between outputs delivered from the adders 43 and 51, phase correction must be implemented.

Figure 6:
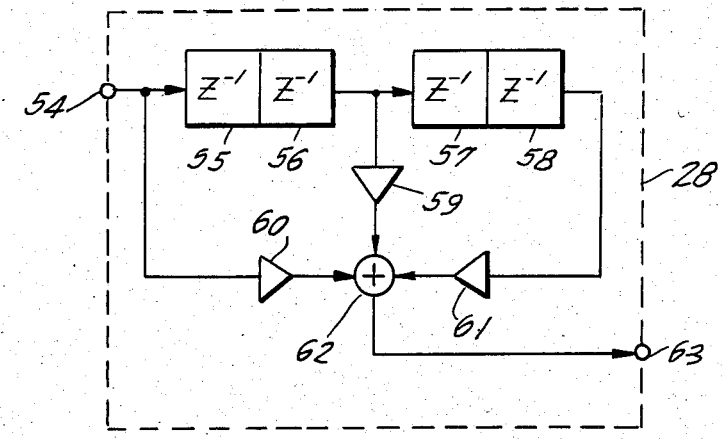
FIG. 6 is a block diagram showing a filter shown in FIG. 5.

FIG. 6 shows an example of the filter 28 in FIG. 5. The filter 28 is of a digital filter which comprises registers 55, 56, 57 and 58 for one sampling period delay, multipliers 60, 59 and 61 having coefficients of $\frac{1}{4}, \frac{1}{2}$ and $\frac{1}{4}$, respectively, and an adder 62. The signal applied to an input terminal 54 is transmitted at an output terminal 63 after the subcarrier component has been removed therefrom. The other filters 47 and 48 in FIG. 5 are similarly constructed.

Figure 7:
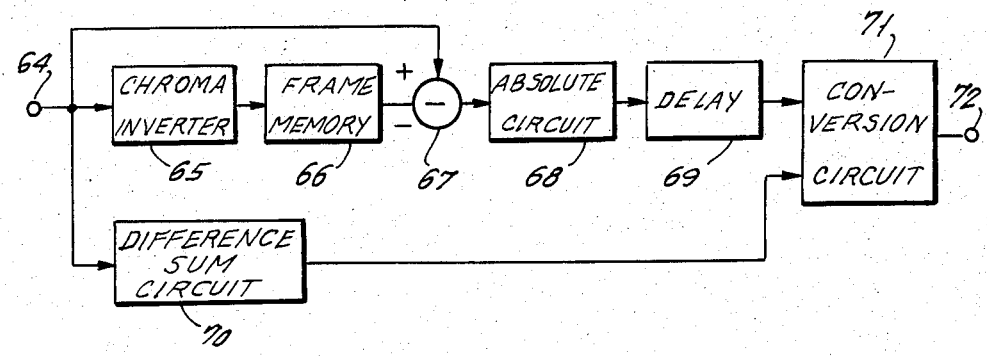
FIG. 7 is a block diagram of a third embodiment of the present invention.

FIG. 7 shows a third embodiment of the present invention. In this embodiment, when a frame difference signal is produced, a chrominance signal polarity inverting circuit is used for cancelling chrominance components.

In FIG. 7, a digital color television signal in the NTSC system sampled with $4f_{sc}$ and applied to an input terminal 64 is supplied to the chrominance signal polarity inverting circuit 65, a subtractor 67 and a picture element difference sum computing circuit 70. The chrominance signal polarity inverting circuit 65 inverts the polarity of the color subcarrier signal of the color television signal and outputs the inverted signal to a frame memory 66. The frame memory 66 transmits the delayed television signal to the subtractor 67. In this case, the delay time due to the combination of the chrominance signal polarity inverting circuit 65 and the frame memory 66 is set to one frame period. The subtractor 67 generates the frame difference signal.

An absolute value circuit 68 receives the frame difference signal and produces an absolute value thereof. The absolute value is supplied through a delay circuit 69, which performs delay compensation, to a conversion circuit 71.

The picture element difference sum computing circuit 70 has the same function as the picture element difference sum computing circuit 32 of FIG. 5. It produces a picture element difference sum signal of the Y signal from the composite color television signal and transmits the produced sum signal to the conversion circuit 71. The conversion circuit 71 has the same function as the conversion circuit 5 of FIG. 1, so that it outputs a signal indicating the degree of movement based on the frame difference signal and the picture element difference sum signal at its output terminal 72.

Figure 8:
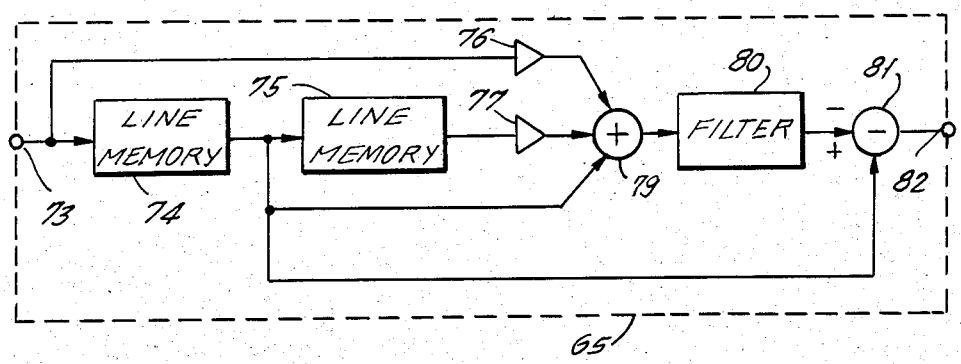
FIG. 8 shows a chrominance signal polarity inverting circuit shown in FIG. 7.

FIG. 8 shows the construction of the chrominance signal polarity inverting circuit 65. The circuit 65 is a digital filter which comprises line memories 74 and 75 for one horizontal scanning period delay, multipliers 76 and 77 having coefficients of $-\frac{1}{2}$ and $-\frac{1}{2}$, adder 79, a band pass filter 80 for passing the frequency around $f_{sc}$ therethrough, and a subtractor 81.

The band pass filter 80 can be realized, for example, by replacing the coefficients of the multipliers 60, 59 and 61 in the filter 28 of FIG. 6 with $-\frac{1}{4}, \frac{1}{2}$ and $-\frac{1}{4}$, respectively. As a result, the filter 80 is tailored to pass the $f_{sc}$ component therethrough. Incidentially, the chrominance signal polarity inverting circuit 65 and the picture element difference sum computing circuit 70 may be arranged to have a common line memory. In case the frame difference of the C signal becomes larger due to cross talk of the high frequency brightness signal, the weight of the frame difference of the C signal is set smaller than one to reduce the detection sensitivity of movement with such a frequency component.

Figure 9:
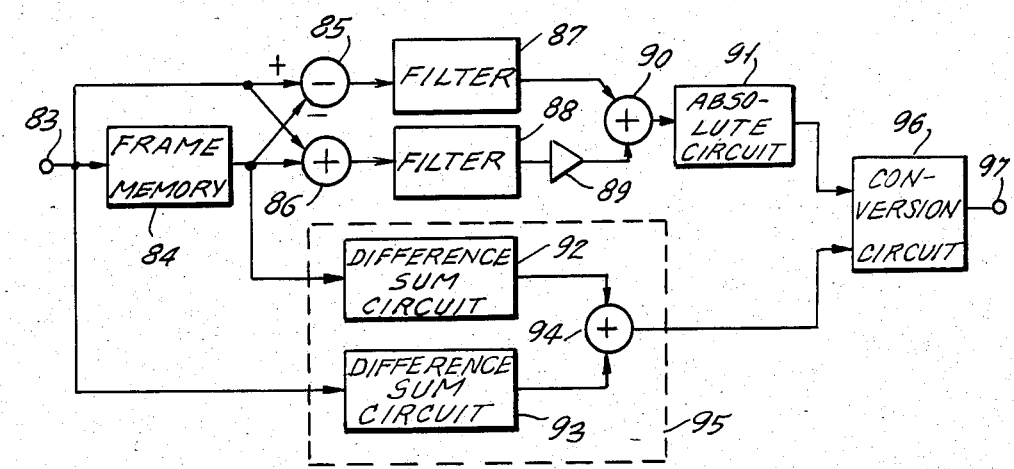
FIG. 9 is a block diagram of a fourth embodiment of the present invention.

FIG. 9 is a block diagram of a fourth embodiment of the present invention. In this embodiment, a frame difference signal is determined by adding a Y frame difference and a chrominance (C) frame difference. In this case, a coefficient for adding the chrominance frame difference is adjusted to small value, for example, less than "1". Furthermore, a picture element difference sum signal is determined for two frame periods, in this embodiment.

In FIG. 9, a digital color television signal in the NTSC system sampled with $4f_{sc}$ is supplied through an input terminal 83 to a subtractor 85, an adder 86, a frame memory 84 and a first picture element difference sum computing circuit 92 of a picture element difference sum computing circuit 95. The frame memory 84 delays the input signal by one frame period and supplies it to the subtractor 85, and adder 86 and a second picture element difference sum computing circuit 93.

The subtractor 85 outputs a signal containing the Y frame difference and the C signal having a twofold magnitude to a filter 87. The filter 87 has characteristics to block the subcarrier frequency $f_{sc}$ and, therefore, output the frame difference signal of the Y signal to an adder 90. On the other hand, the adder 86 outputs a signal containing the Y signal having a twofold magnitude and the C frame difference to a filter 88. The filter 88 has the characteristic to pass only the subcarrier frequency $f_{sc}$ and therefore, outputs the frame difference signal of the C signal to a multiplier 89 having the coefficient K less than "1". A adder 90 adds the Y frame difference delivered from the filter 87 and the C frame difference delivered from the multiplier 89, and outputs a frame difference signal, as a result. The frame difference signal is supplied to an absolute circuit 91. The absolute circuit 91 outputs the absolute value of the frame difference signal to a conversion circuit 96. The first and second picture element difference sum computing circuits 92 and 93 calculate the picture element difference sum for the previous and present frames, respectively, and transmit them to an adder 94. Therefore, the adder 94 outputs the result as the picture element difference sum signal to the conversion circuit 96. The conversion circuit 96 produces a signal indicating the degree of movement based on the frame difference signal and the picture element difference sum signal, and then supplies it to an output terminal 97.

In this case, when there is a time difference between the frame difference signal and picture element difference sum signal, a delay circuit is inserted between the blocks 90 and 96. It is to be noted that the filter 87, the filter 88, the first and second picture element difference sum computing circuits 92 and 93, and the conversion circuit 96 have the same construction as the filter 28 in FIG. 5, the filter 80 in FIG. 8, the first picture element difference sum computing circuit 32 in FIG. 5 and the conversion circuit 5 in FIG. 1, respectively.

Figure 10:
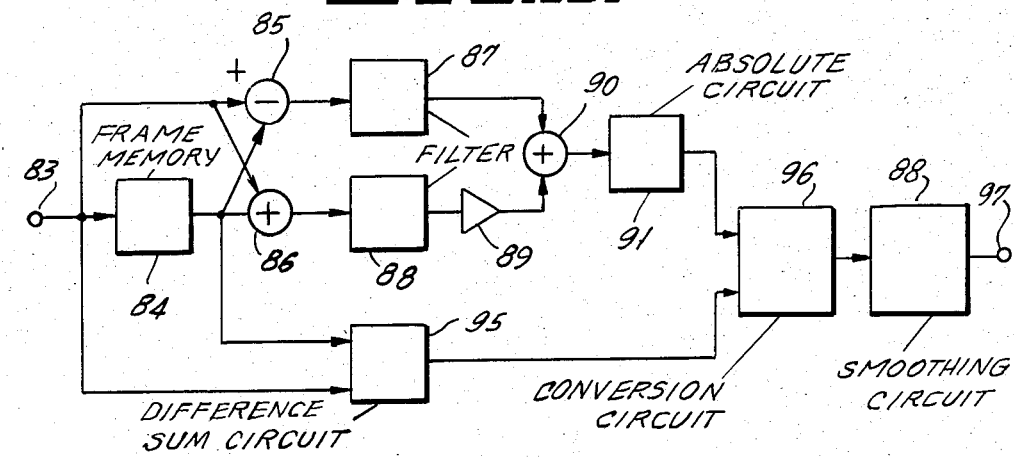
FIG. 10 is a block diagram of a fifth embodiment of the present invention.

FIG. 10 is a block diagram of a fifth embodiment of the present invention. In this embodiment, a smoothing circuit 98 is added to the embodiment of FIG. 9 so as to smooth the signal indicating the degree of movement. The smoothing circuit 98 checks signals in the vicinity of the present signal indicating the movement, for example, checks the front, back, upper and lower four samples of the signal indicating the movement, so that, in case where the present signal indicating complete moving is isolated among the signals indicating standstill, the present signal is determined to be a standstill signal and, in the opposite case, it is determined to be a moving signal. As an alternate smoothing method, a filter may be added for the frame difference signal in FIGS. 1 and 7 to perform the desired smoothing.

The picture element difference sum computing circuit 3 in FIG. 2 can be modified. For example, the difference relative to only the upper picture element in the vertical direction may be used to avoid larger relative delay with respect to the frame difference signal and, as a result, to further simplify the hardware. If only the absolute value of picture element difference relative to the front sample in the present frame is used, hardware is reduced even further.

When the numbers of samples, i.e., the number of differences between picture elements for producing the picture element difference sum signal is varied, it is required to adjust the coefficients of gains or the conversion characteristics correspondingly because the average magnitude of the picture element difference sum signal is also varied. When the picture element difference sum signal is produced by adding plural differences between picture elements, weighting for each difference may be varied in accordance with a picture element picture. Further, the conversion characteristics shown in FIGS. 3 and 4 may be modified. When the conversion characteristic is determined, it is also possible that two actual standstill frames of a image are gradually shifted from each other, and the relationship between the frame difference signal and the picture element difference sum signal at respective shifted positions is practically obtained for many picture elements in a statistic fashion thereby to determine the conversion characteristic.

While the frame difference of the Y signal and the K-multiplied frame difference of the C signal are added to produce the frame difference signal in the embodiments of FIGS. 9 and 10, such addition may be effected after taking absolute values of the respective signals. In this case, there can be attained improved accuracy when the detection result is applied to an adaptive Y/C separation because the frame difference signal includes both the Y frame difference information and the C frame difference information. Further, detection of movement may be performed based on three signals, i.e., the Y frame difference, the C frame difference and the picture element difference sum signal.

In the embodiment described above, the moving detection is performed by evaluating the frame difference signal against the picture element difference sum signal. More simplified methods will be described in following embodiments, in which the movement detection is performed by evaluating the frame difference signal in light of the level of a high frequency component in a television signal.

Figure 11:
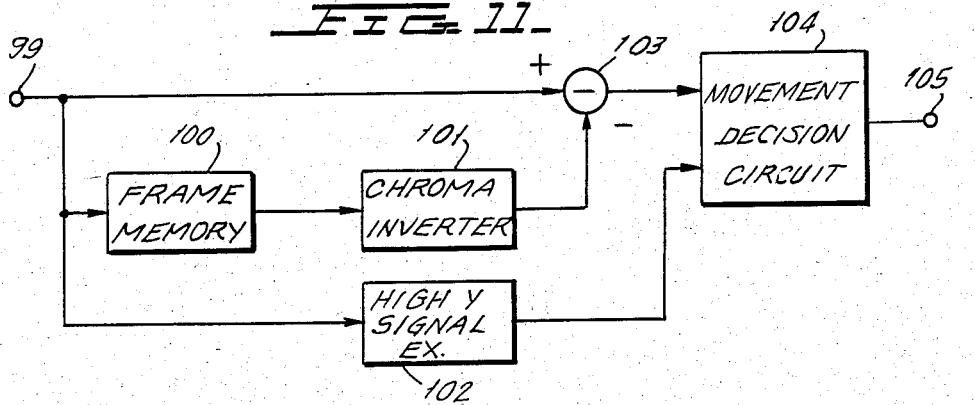
FIG. 11 is a block diagram of a sixth embodiment of the present invention.

Referring to FIG. 11 showing a sixth embodiment, a color television signal of the NTSC system is applied through an input terminal 99 to a frame memory 100. The chrominance (C) signal contained in the delayed television signal delivered from the frame memory 100 is inverted in its polarity by a chrominance polarity inverting circuit 101 to have the same polarity as the input television signal. The difference between the input television signal and the delayed television signal from the frame memory 100 is calculated by a subtraction circuit 103 to obtain a frame difference signal which is supplied to a movement decision circuit 104.

The input television signal is also supplied to a high frequency brightness signal extracting circuit 102, by which the signal corresponding to the high frequency component of a brightness (Y) signal is extracted to be supplied to the movement decision circuit 104. The movement decision circuit 104 is arranged to control the level of the frame difference signal in accordaance with the magnitude of high frequency Y signal, so that the frame difference signal subjected to the level control is delivered as a movement information signal.

Figure 12:
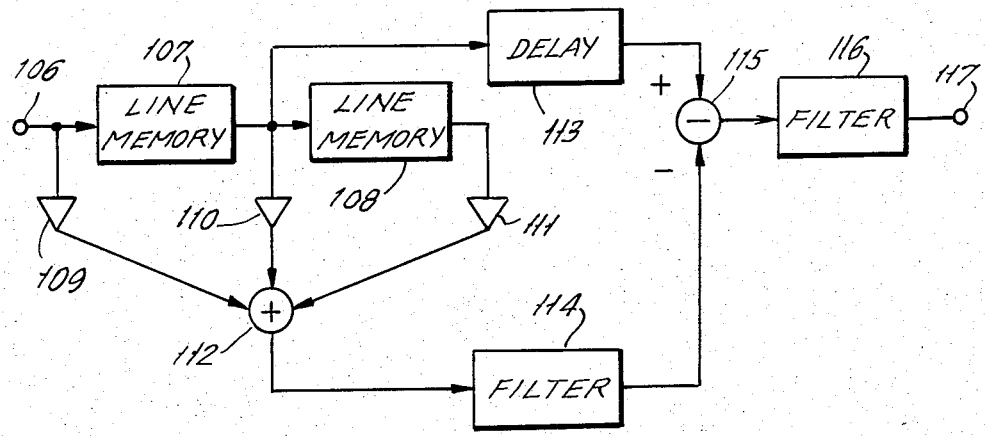
FIG. 12 shows a high frequency brightness signal extracting circuit used in the present invention.

FIG. 12 shows a block diagram of the high frequency brightness signal extracting circuit 102 in FIG. 11. This circuit is arranged so as to extract a high frequency Y signal by using a comb-like filter including two line memories 107 and 108 and a high pass filter 116. The color television signal applied to an input terminal 106 is delayed through line memories 107 and 108 by one horizontal period, respectively. Multipliers 109, 110 and 111 have coefficients of $-\frac{1}{4}$, $\frac{1}{2}$ and $-\frac{1}{4}$, respectively. The multiplied outputs are added by an adder 112 and then supplied to a band pass filter 114. The band pass filter 114 passes only the signal around the color subcarrier frequency $f_{sc}$ therethrough and then transmits the extracted color subcarrier (C) signal to a subtractor 115. The composite color television signal delivered from the line memory 107 is delayed by a delay circuit 113 to be matched with delay of the C signal and then supplied to the subtractor 115. In the subtractor 115, the C signal is subtracted from the composite color television signal to obtain only the Y signal. The extracted Y signal is supplied to a high pass filter 116, in which the high frequency Y signal is extracted and supplied to an output terminal 117.

FIGS. 13 (a) and (b) show characteristics of the movement decision circuit 104. In FIG. 13(a), the relationship between the magnitude x of the frame difference signal and the magnitude y of a movement detection signal is shown, and the function of y=f(x) is represented by a linear line of y=kx (where k is the slope in this case.

The gradient or slope k is dependent on the magnitude z of the high frequency Y signal, and FIG. 13(b) illustrates the relationship between the magnitude z of high frequency Y signal and the gradient k. Namely, as the magnitude z of high frequency Y signal becomes larger, the gradient k becomes smaller than one. In other words, when the magnitude of the high frequency Y signal is larger, the magnitude of frame difference signal is attenuated to obtain the movement detection signal. The movement decision circuit 104 having the characteristic shown in FIG. 13 can be easily realized by using a read only memory (ROM), which stores the relationship between the frame difference signal and the high frequency Y signal. Therefore, the frame difference signal and the high frequency Y signal are applied to the ROM as address inputs, and the movement detection signal is delivered from the output of the ROM.

FIG. 14 is a block diagram of a seventh embodiment of the present invention. In this embodiment, the frame difference signal is obtained by adding the frame difference of the Y signal and the frame difference of the C signal. A composite color television signal applied to an input terminal 118 is supplied to a subtractor 121, an adder 122, a frame memory 119 and a high frequency brightness signal extracting circuit 120. The combination of the frame memory 119, the subtractor 121, the adder 122, filters 123 and 124, a multiplier 125 and an adder 126 is built up for extracting the frame difference signal containing the Y frame difference and the C frame difference, as explained in FIG. 9. In this case, the coefficient of the multiplier 125 is set to "1". Of course, it in possible to change the coefficient value of the multiplier 125 for changing the weight of the C frame difference. The high frequency brightness signal extracting circuit 120 has the same construction as that of FIG. 12, and transmits the high frequency component of the Y signal to a movement decision circuit 127. The movement decision circuit 127 has the same function as the movement decision circuit 104 in FIG. 11, so that the movement detection signal is delivered at an output terminal 129.

Figure 15:
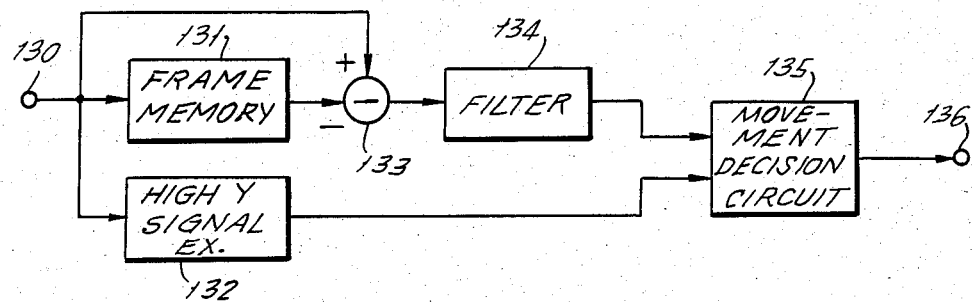
FIG. 15 is a block diagram of an eighth embodiment of the present invention.

Referring now to FIG. 15 showing an eighth embodiment of the present invention, this embodiment is arranged such that a chrominance (C) signal is ignored to simplify a circuit configuration by taking into account that the brightness (Y) signal has a major influence upon the detection of movement. A frame-memory 131, a high frequency brightness signal extracting circuit 132, a subtractor 133, a filter 134 and a movement decision circuit 135 have the same function as the frame memory 119, the high frequency brightness signal extracting circuit 120, the subtractor 121, the filter 123 and the movement decision circuit 127, respectively, and operate in a similar manner correspondingly. In other words, this is corresponds to the case where the coefficient of the multiplier 125 is set zero in FIG. 14.

Figure 16:
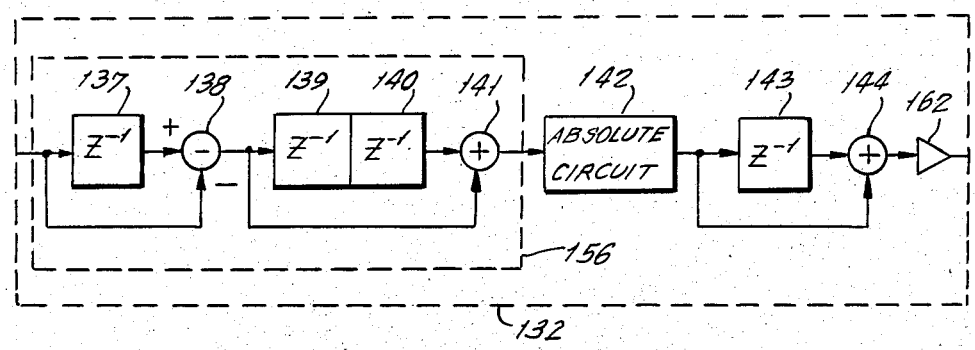
FIG. 16 shows another example of a high frequency brightness signal extracting circuit shown in FIG. 15.

FIG. 16 shows another example of the high frequency brightness signal extracting circuit 132 in FIG. 15. In FIG. 16, in order to simply obtain a high frequency Y signal without using a line memory, there is employed a filter 156 for blocking the signals in the vicinity of zero frequency and the subcarrier frequency. The filter 156 comprises delay circuit 137, 139 and 140 each for one sampling period delay, a subtractor 138 and an adder 141. The high frequency Y signal delivered from the filter 156 is fed to an absolute circuit 142 to take the absolute value thereof. The absolute value is fed to a delay circuit 143 having one sampling period delay and an adder 144. The adder adds the absolute values from the delay circuit 143 and the absolute circuit 142. Further, an average value is delivered from a multiplier 162 having a coefficient of $\frac{1}{2}$.

Figure 17:
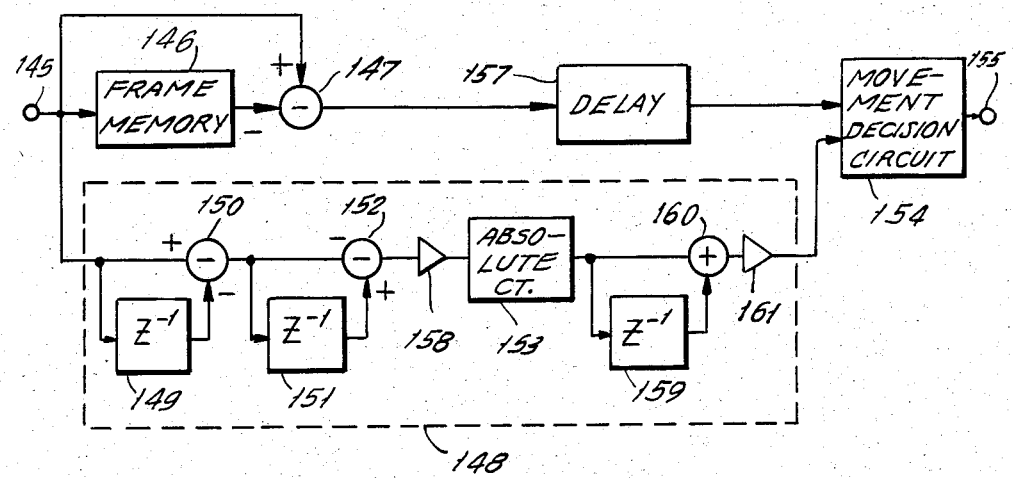
FIG. 17 is a block diagram of a nineth embodiment of the present invention.

FIG. 17 is a block diagram of a nineth embodiment of the present invention. This embodiment is provided for detecting the movement a monochromatic television signal. A monochromatic television signal from an input terminal 145 is supplied to a frame memory 146, and a subtractor 147. The subtractor 147 produces a frame difference signal. The frame difference signal is supplied through a delay circuit 157 to a movement decision circuit 154. In a high frequency brightness signal extracting circuit 148, delay circuits 149 and 151 each having one sampling period delay, subtractors 150 and 152 and a multiplier 158 having coefficient of $\frac{1}{4}$ comprise a filter having a transmission function H(z) represented by z-conversion as follows:

$$H(z)=\tfrac{1}{4}(-Z^{-2}+2Z^{-1}-1)$$

The high frequency Y signal delivered from the multiplier 158 is fed to an absolute circuit 153. The absolute value from the circuit 153 is fed to a delay circuit 159 and, adder 160, and then, a multiplier 161 having coefficient of $\frac{1}{2}$ produces an average value. This average value is supplied to the movement decision circuit 154. The movement decision circuit 154 has the same function as the movement decision circuit 104 in FIG. 11, so that it outputs a signal indicating the degree of movement to an output terminal 155. The chrominance signal polarity inverting circuit 101, shown in FIG. 11, can take the form of frame memory 100. Therefore, circuit economy can be achieved upon making joint use of certain line memories that are necessary both in the high frequency brightness signal extracting circuit 102 and other elements that are shown in FIG. 11. As signal extracting circuit 102. As an alternative, a high frequency Y signal for the moving detection may be extracted from the signal delivered from the frame memory. In FIGS. 11 and 14, when there is a delay difference between the frame difference signal and the high frequency Y signal, a proper delay circuit should be inserted into either signal line. When the high frequency Y signal is used for the moving detection, it is alternatively possible to use its power value or it level average value of previous and subsequent several samples.

In the embodiments of FIGS. 11 and 14, the movement detection signal obtained at each of the output terminals 105 and 129 has a value of zero in the standstill image area and has a certain amplitude in the moving image area. To classify the image into several regions from stillness to full movement in accordance with the degree of movement, the amplitude of the movement detection signal is compared with several threshold values for finding the correct region.

While the function y=f(x) shown in FIG. 13(a) is linear, a non-linear characteristic may be also used such that a frame difference signal of less than a given value can be regarded as noise and the movement detection signal of zero is delivered in this region as shown in FIG. 18.

In the embodiment of FIG. 14, the frame difference signal is obtained by adding the Y frame difference and the C frame difference. In such cases, it is not required to match weighting factors of the two frame differences. In fact, the C frame difference is apt to be larger than the Y frame difference even when the brightness (Y) and chrominance (C) signals contain the same movement because a cross talk of the high frequency Y signal, a jitter, etc. are contained in the television signal. Therefore, it is preferred to make the weighting factor of the C difference smaller, for example, less than "1".

While the conversion circuit 128 is shown to include the adder 126 and the movement decision circuit 127 in the embodiment of FIG. 14, it can be also realized by using a read only memory (ROM). Furthermore, three types of input/output characteristics of $f_5(x)$, $f_6(x)$ and $f_7(x)$ as shown in FIG. 19 can be implemented, and one of the characteristic is selected in accordance with the magnitude of high frequency Y signal.

As fully described above, the present invention permits correct movement detection in a monochromatic signal and a color television signal including the edge portions thereof. Therefore, the present invention can be applied to various video signal processing circuits, such as an adaptive Y/C separator and scanning sequence converter, which utilize movement information of images.

What is claimed is:

1. A movement detection apparatus for detecting the degree of movement of an image which is represented by a composite television signal having a brightness signal component and a chrominance signal component, said apparatus comprising:

means for producing a first frame difference signal having a magnitude which is related to the difference between a present and previous brightness television signal, said frame difference means operating independently of the direction of movement of picture elements of said image;

means for producing a second frame difference signal having a magnitude which is related to the difference between a present and previous chrominance signal, said frame difference producing means operating independently of the direction of movement of picture elements of said image;

means for producing a first sum of picture element differences signal having a magnitude which is related to the differences between the value of a given picture element and adjacent picture elements based on said brightness signal component of said television signal, said first sum of picture element differences means operating independently of the direction of movement of picture elements of said image;

means for producing a second sum of picture element differences signal having a magnitude which is related to the differences between the value of a given picture element and adjacent picture elements based on the chrominance signal on said chrominance signal component of said television signal, said second sum of picture element differences means operating independently of the direction of movement of picture elements of said image; and means for producing an output which is indicative of the degree of movement of said image in response to said first and second frame difference signals and said first and second picture element differences signals.

2. The apparatus of claim 1, further comprising a multiplier for scaling said second frame difference signal and an addition circuit for combining said first frame difference signal and said second frame difference signal scaled by said multiplier.

3. The apparatus of claim 2, further comprising a smoothing circuit for smoothing said output which is indicative of the degree of movement of said image.

4. The apparatus as in claim 1, wherein said composite television signal comprises a digitized television signal.

5. A movement detection apparatus for detecting the degree of movement of an image which is represented by a television signal, said apparatus comprising:

means for producing a frame difference signal having a magnitude which is related to the difference between a present and a previous television signal, said frame difference means operating independently of the direction of movement of picture elements of said image;

means for producing a sum of picture element differences signal having a magnitude which is related to the differences between the value of a given picture element and adjacent picture elements, said picture element differences means operating independently of the direction of movement of picture elements of said image; and means for producing an output which is indicative of the degree of movement of said image in response to said frame difference signal and said picture element differences signal;

said means for producing a frame difference signal including a frame memory for storing therein previous frame data of said television signal and subtractor means for calculating a difference between said television signal and said previous frame data;

said picture element differences means comprising first means responsive to said television signal for producing a present frame sum of picture element differences signal, second means responsive to said previous frame data for producing a previous frame sum of picture element differences signal and a first addition circuit for adding said present and previous picture element differences signal, each said first and second means comprising:

an input;

a first subtraction circuit and a first line memory connected to said input, said line memory having an output connected to said first subtraction circuit, said first subtraction circuit having an output for calculating a difference between signals from said input and said first line memory; a first absolute value circuit for generating an absolute value of said output of said first subtraction circuit; a second line memory and a first addition circuit having respective inputs for receiving said absolute value, said second line memory having an output connected to another input of said first addition circuit, said first addition circuit having an output representing a difference between said inputs of said first addition circuit;

a delay circuit for delaying said output of said first addition circuit, said delayed output constituting said sum of picture element differences signal;

a first one sample delay and a second subtraction circuit having a respective first input connected to said first line memory, said second subtraction circuit having a second input connected to said first one sample delay and an output representing the difference between said first and second inputs of said second subtraction circuit;

a second absolute value circuit connected to said output of said second subtraction circuit; and a second one sample delay and a second addition circuit having respective first inputs connected to said second absolute value circuit, said second one sample delay being further connected to a second input of said second addition circuit, said second addition circuit having an output, said output of said second addition circuit being effective for enabling calculation of said previous frame sum of picture element differences signal.

6. A movement detection apparatus for detecting the degree of movement of an image which is represented by a composite television signal having a brightness signal component and a chrominance signal component, said apparatus comprising:

means for producing a frame difference signal having an output which is related to the difference between a present and a previous television signal, said frame difference means operating independently of the direction of movement of picture elements of said image;

first means for filtering from said output of said frame difference signal said chrominance signal component to produce a filtered frame difference signal;

means for producing a sum of picture element differences signal having a magnitude which is related to the differences between the value of a given picture element and adjacent picture elements, said picture element differences means operating independently of the direction of movement of picture elements of said image;

second means for filtering from said picture element differences signal said chrominance signal component to produce a picture filtered element differences signal; and meaans for producing an output indicative of the degree of movement of said image in response to said filtered frame difference signal and said filtered picture element differences signal;

said picture element differences means comprising a 2-line type comb filter which includes first and second series connected line memories;

first, second and third multipliers respectively connected to said television signal, said first line memory and said second line memory;

a first addition circuit for adding the outputs of said first, second and third multipliers;

said frame difference signal producing means comprising a frame memory for storing therein previous frame data of said television signal and subtractor means for calculating a difference between said television signal and said previous frame data;

an absolute value circuit connected to said first filtering means, and a delay circuit connected to said absolute value circuit, said delay circuit being connected to said means for producing an output indicative of the degree of movement of said image;

said picture element differences signal producing means further comprising a first one sample delay circuit connected to said comb filter; a first subtraction circuit connected to said first one sample delay circuit and said comb filter; an absolute value circuit connected to said first subtraction circuit; a second one sample delay circuit connected to said absolute value circuit; a second addition circuit connected to said second one sample delay circuit and to said absolute value circuit; a second subtraction circuit connected to said television signal and to said first line memory; a third subtraction circuit connected to said first line memory and to said second line memory; a respective filtering means connected to each said second and third subtraction circuits; a third addition circuit connected to said respective filtering means; and a fourth addition circuit connected to said third addition circuit and to said second addition circuit, said fourth addition circuit being coupled to said means for producing an output indicative of the degree of movement of said image.

7. A movement detecting apparatus for detecting the degree of movement of an image which is represented by a composite television signal having a brightness signal component and a chrominance signal component, said apparatus comprising:

means for producing a frame difference signal having a magnitude which is related to the difference between a present and previous television signal;

means for obtaining a high frequency component signal from said composite television signal; and means for producing an output which is indicative of the degree of movement of said image, said output being proportional to said frame difference signal and being scaled by said high frequency component signal;

said means for producing said frame difference signal including first means for producing a first frame difference signal based on said brightness signal component, a second means for producing a second frame difference signal based on said chrominance signal component, and an addition circuit for combining said first and second frame difference signals.

8. The apparatus of claim 7, further comprising a multiplier for scaling said second frame difference signal.

9. A movement detecting apparatus for detecting the degree of movement of an image which is represented by a composite television signal having a brightness signal component and a chrominance signal component, said apparatus comprising:

means for producing a frame difference signal having a magnitude which is related to the difference between a present and previous television signal;

means for obtaining a high frequency component signal from said composite television signal; and means for producing an output which is indicative of the degree of movement of said image, said output being proportional to said frame difference signal and being scaled by said high frequency component signal;

said means for obtaining a high frequency component signal comprising a first one sample delay element; a subtraction circuit connected to said first one sample delay circuit and to said television signal; a two sample delay circuit connected to said subtraction circuit; a first addition circuit connected to said two sample delay circuit and to said subtraction circuit; an absolute value circuit connected to said first addition circuit; a second one sample delay circuit connected to said absolute value circuit; and a second addition circuit connected to said second one sample delay circuit and to said absolute value circuit.

10. A movement detection apparatus for detecting the degree of movement of an image which is represented by a composite television signal having a brightness signal component and a chrominance signal component, said apparatus comprising:

means for producing a first frame difference signal having a magnitude which is related to the difference between a present and previous brightness television signal, said frame difference means operating independently of the direction of movement of picture elements of said image;

means for producing a second frame difference signal having a magnitude which is related to the difference between a present and a previous chrominance signal, said frame difference producing means operating independently of the direction of movement of picture elements of said image;

means for producing a first sum of picture element differences signal having a magnitude which is related to the differences between the value of a given picture element and adjacent picture elements based on a present frame, said first sum of picture element differences means operating independently of the direction of movement of picture elements of said image;

means for producing a second sum of picture element differences signal having a magnitude which is related to the differences between the value of a given picture element and adjacent picture elements based on a previous frame, said second sum of picture element differences means operating independently of the direction of movement of picture elements of said image; and means for producing an output which is indicative of the degree of movement of said image in response to said first and second frame difference signals and said first and second picture element differences signals.

11. The apparatus of claim 10, further comprising a multiplier for scaling said second frame difference signal and an addition circuit for combining said first frame difference signal and said second frame difference signal scaled by said multiplier.

12. The apparatus of claim 11, further comprising a smoothing circuit for smoothing said output which is indicative of the degree of movement of said image.

* * * * *